US011500748B1

(12) United States Patent
Ofir et al.

(10) Patent No.: US 11,500,748 B1
(45) Date of Patent: Nov. 15, 2022

(54) PROCESSOR CORE DEBUGGING WITH PROCESSOR VIRTUALIZATION

(71) Applicant: Marvell Asia Pte Ltd, Singapore (SG)

(72) Inventors: Nir Ofir, Yuvalim (IL); Wilson P. Snyder, II, Holliston, MA (US); Amit Shmilovich, Kiryat ATA (IL)

(73) Assignee: Marvell Asia Pte Ltd, Singapore (SG)

( * ) Notice: Subject to any disclaimer, the term of this patent is extended or adjusted under 35 U.S.C. 154(b) by 0 days.

(21) Appl. No.: 17/304,598

(22) Filed: Jun. 23, 2021

Related U.S. Application Data (60) Provisional application No. 63/042,994, filed on Jun. 23, 2020.

(51) Int. Cl.
| | |
|---|---|
| *G06F 11/00* | (2006.01) |
| *G06F 11/22* | (2006.01) |
| *G06F 11/07* | (2006.01) |
| *G06F 11/36* | (2006.01) |

(52) U.S. Cl.
CPC ...... *G06F 11/2236* (2013.01); *G06F 11/0772* (2013.01); *G06F 11/366* (2013.01); *G06F 11/3656* (2013.01)

(58) Field of Classification Search
CPC ............. G06F 11/2242; G06F 11/3656; G06F 11/3636; G06F 11/2236; G06F 11/366; G06G 11/0772
See application file for complete search history.

(56) References Cited

U.S. PATENT DOCUMENTS

| | | | | |
|---|---|---|---|---|
| 7,665,002 | B1* | 2/2010 | White | G01R 31/31705 714/733 |
| 9,830,241 | B2* | 11/2017 | Lippett | G06F 11/263 |
| 2005/0034017 | A1* | 2/2005 | Airaud | G06F 11/2242 714/25 |
| 2013/0326203 | A1* | 12/2013 | Usui | G06F 11/3656 712/E9.032 |
| 2014/0281735 | A1* | 9/2014 | Olivarez | G06F 11/2242 714/40 |

\* cited by examiner

*Primary Examiner* — Charles Ehne
(74) *Attorney, Agent, or Firm* — Hamilton, Brook, Smith & Reynolds, P.C.

(57) ABSTRACT

A device, such as a system on a chip (SoC), includes a plurality of processor cores, a broadcaster module, a plurality of decoder units, and an aggregator module. The broadcaster module broadcasts a debug request from a debugger device to one or more of the plurality of processor cores via a bus, the debug request including an address specifying a logical identifier associated with a target processor core of the plurality of processor cores. The decoder units, associated with the processor cores, forward the debug request to a debug module of the respective processor core in response to detecting a match. If no match is detected, the decoder units forward the debug request to a subsequent processor core via the bus. The aggregator module forward a response message to the debugger device, the response message originating from the target processor core.

26 Claims, 5 Drawing Sheets

CORE TABLE

| CORE LOCICAL ID 405 | CORE PHYSICAL ID 410 | PROCESSOR COUNT 415 |
|---|---|---|
| 1 | [IDENTIFIER] | n |
| N/A | [IDENTIFIER] | |
| 2 | [IDENTIFIER] | |
| 3 | [IDENTIFIER] | |
| 4 | [IDENTIFIER] | |
| ... | ... | |
| n | [IDENTIFIER] | |

PROCESSOR CORE DEBUGGING WITH PROCESSOR VIRTUALIZATION

RELATED APPLICATION(S)

This application claims the benefit of U.S. Provisional Application No. 63/042,994, filed on Jun. 23, 2020. The entire teachings of the above application are incorporated herein by reference.

BACKGROUND

Integrated circuits, such as system on a chip (SoC) devices, continue to increase in complexity as manufacturers incorporate new features and additional components, such as a greater number of processor cores. With this increasing complexity, the cost to manufacture those devices also increases, due in part to a lower manufacturing yield result of the greater difficulty of manufacturing those devices. Concurrently, newer semiconductor devices are manufactured under increasingly smaller process nodes, which also increases the difficulty and lowers the manufacturing yield of those devices.

One approach to improve manufacturing yields is to configure and sell defective devices as other, less complex devices. For example, a 64-core device may exhibit manufacturing defects that render a few of its cores unusable. Those defective cores can be identified by testing and verifying each of the cores in turn. If enough of the cores are confirmed to be functional, then the device can be configured such that it operates as a device with fewer cores, and the defective cores are rendered inactive. Thus, the 64-core device can be configured and sold as a 48-core device, thereby improving manufacturing yield.

SUMMARY

Example embodiments include a circuit comprising a plurality of processor cores, a broadcaster module, a plurality of decoder units, and an aggregator module. The broadcaster module may be configured to broadcast a debug request from a debugger device to at least one of the plurality of processor cores via a bus, the debug request including an address specifying a logical identifier associated with a target processor core of the plurality of processor cores. The plurality of decoder units may each be associated with a respective one of the plurality of processor cores and may be configured to forward the debug request to a debug module of the respective processor core in response to detecting a match between the address of the debug request and a logical identifier associated with the respective processor core. The decoder units may also be configured to forward the debug request towards a subsequent one of the plurality of processor cores via the bus in response to detecting a mismatch between the address and the logical identifier. The aggregator module may be configured to forward a response message to the debugger device, the response message originating from the target processor core.

At least one terminator module may be connected to a respective terminal end of the bus, and may be configured to forward an error signal to the aggregator module in response to receiving the debug request. The bus may include a plurality of parallel branches, each of the plurality of parallel branches connecting to a subset of the plurality of processor cores and terminating at one of the at least one terminator module. The broadcaster unit may be further configured to broadcast the debug request to a first one of the plurality of processor cores at each of the plurality of parallel branches. The aggregator module may be further configured to identify a debug success in response to receipt of the response message and at least one error message from the at least one terminator module.

The address of the debug request may be independent of a physical address or identifier of the target processor core. The plurality of processor cores may include at least one defective processor core. A management unit may be configured to 1) assign a respective logical identifier to each functional processor core of the plurality of processor cores and 2) refrain from assigning a respective logical identifier to the at least one defective processor core. The management unit may be further configured to communicate to the debugger device an indication of a number of functional processor cores of the plurality of processor cores. The bus may be configured to transfer the debug request in a manner bypassing the at least one defective processor core. A decoder unit associated with the at least one defective processor core is configured to forward the debug request towards a subsequent one of the plurality of processor cores via the bus.

The debug request may include one of a read request and a write request. The plurality of processor cores, broadcaster module, plurality of decoder units, and aggregator module may be implemented in a common system-on-chip (SoC). Further, the bus may be an Advanced Peripheral Bus (APB).

Further embodiments include a method of debugging a device. A debug request from a debugger device may be broadcast to at least one of a plurality of processor cores via a bus, the debug request including an address specifying a logical identifier associated with a target processor core of the plurality of processor cores. At a decoder module, the debug request may be forwarded to a debug module of a respective processor core of the plurality of processor cores in response to detecting a match between the address of the debug request and a logical identifier associated with the respective processor core. At the decoder module, the debug request may be forwarded towards a subsequent one of the plurality of processor cores via the bus in response to detecting a mismatch between the address and the logical identifier. At an aggregator module, a response message may be transmitted to the debugger device, the response message originating from the target processor core.

At a terminator module connected to a respective terminal end of the bus, an error signal may be forwarded to the aggregator module in response to receiving the debug request. The bus may include a plurality of parallel branches, each of the plurality of parallel branches connecting to a subset of the plurality of processor cores and terminating at one of the at least one terminator module. The debug request may be broadcast to a first one of the plurality of processor cores at each of the plurality of parallel branches. A debug success may be identified in response to receipt of the response message and at least one error message from the terminator module.

The address of the debug request may be independent of a physical address or identifier of the target processor core. The plurality of processor cores may include at least one defective processor core. A respective logical identifier may be assigned to each functional processor core of the plurality of processor cores, and a respective logical identifier to the at least one defective processor core may be refrained from being assigned. An indication of a number of functional processor cores of the plurality of processor cores may be communicated to the debugger device. The debug request may be transferred, via the bus, in a manner bypassing the at least one defective processor core. At a decoder unit associated with a defective processor core, the debug request may be forwarded towards a subsequent one of the plurality of processor cores via the bus.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

Figure 1:
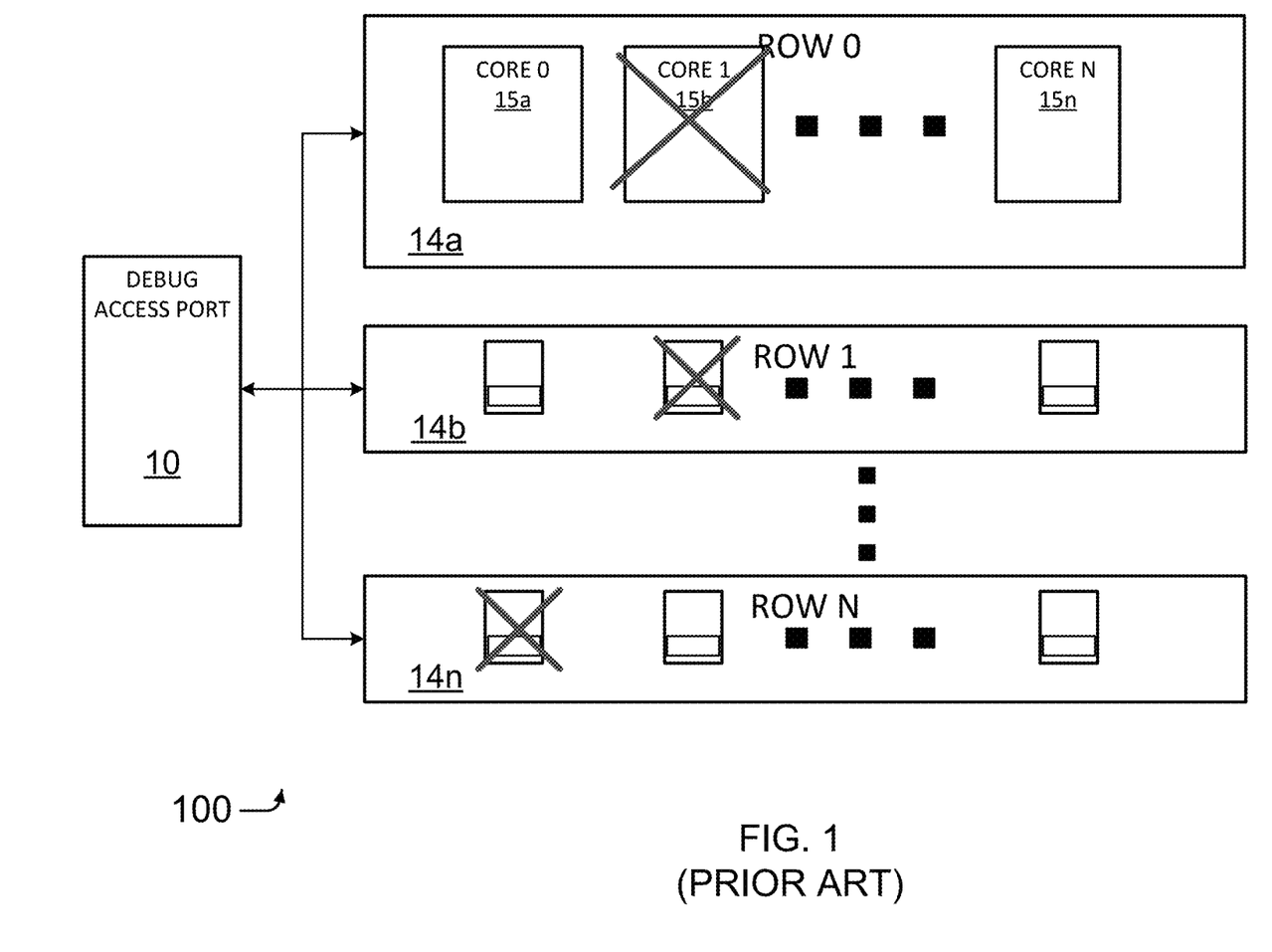
FIG. 1 is a block diagram of a prior-art multi-core processor system.

FIG. 1 is a block diagram of a prior-art multi-core processor system 100. The system 100 includes a plurality of rows 14a-n, each row comprising multiple processor cores 15a-n. For example, if the system 100 is a 64-core device, the 64 cores may be distributed among the rows 14a-n. As shown, a number of the processor cores are defective, including processor core 15b. To test each of the processor cores, a debug access port 10 may interface with each of the rows 14a-n. The debug access port 10 may be an on-chip module that interfaces with an external debugger device (not shown), which may be external to the system 100. Under direction from the external debugger device, the debug access port 10 may forward debug messages, such as a read or write request, to each of the processor cores at each of the rows 14a-n. Active processor cores, such as processor core 15a, may respond to a debug message by processing it within a debug environment of the core and returning an associated response to the debug access port 10. Defective processor cores, such as processor core 15b, may either fail to respond to the debug message or may return a message indicating that the processor core is inactive.

The debug assembly shown in FIG. 1 exhibits a number of disadvantages. For example, each of the processor cores 15a-n must be addressed via a physical identifier (ID), such as a processor number. As a result, the external debugger connecting to the debug access port 10 must maintain an account of both active and defective processor cores. However, if the system 100 were to be configured and sold as a device with fewer cores corresponding to the active processor cores, then it would be advantageous to present the system 100 as possessing only the fewer cores, and as absent the defective cores. Yet the system 100 cannot be presented as such, as the physical IDs of the processor cores reveals the defective processor cores. Thus, an external debugger, and any other device interfacing with the system 100, must account for all of the processor cores including the defective cores, and must configure its communications with the system 100 to address the active processor cores while excluding the defective cores.

Figure 2:
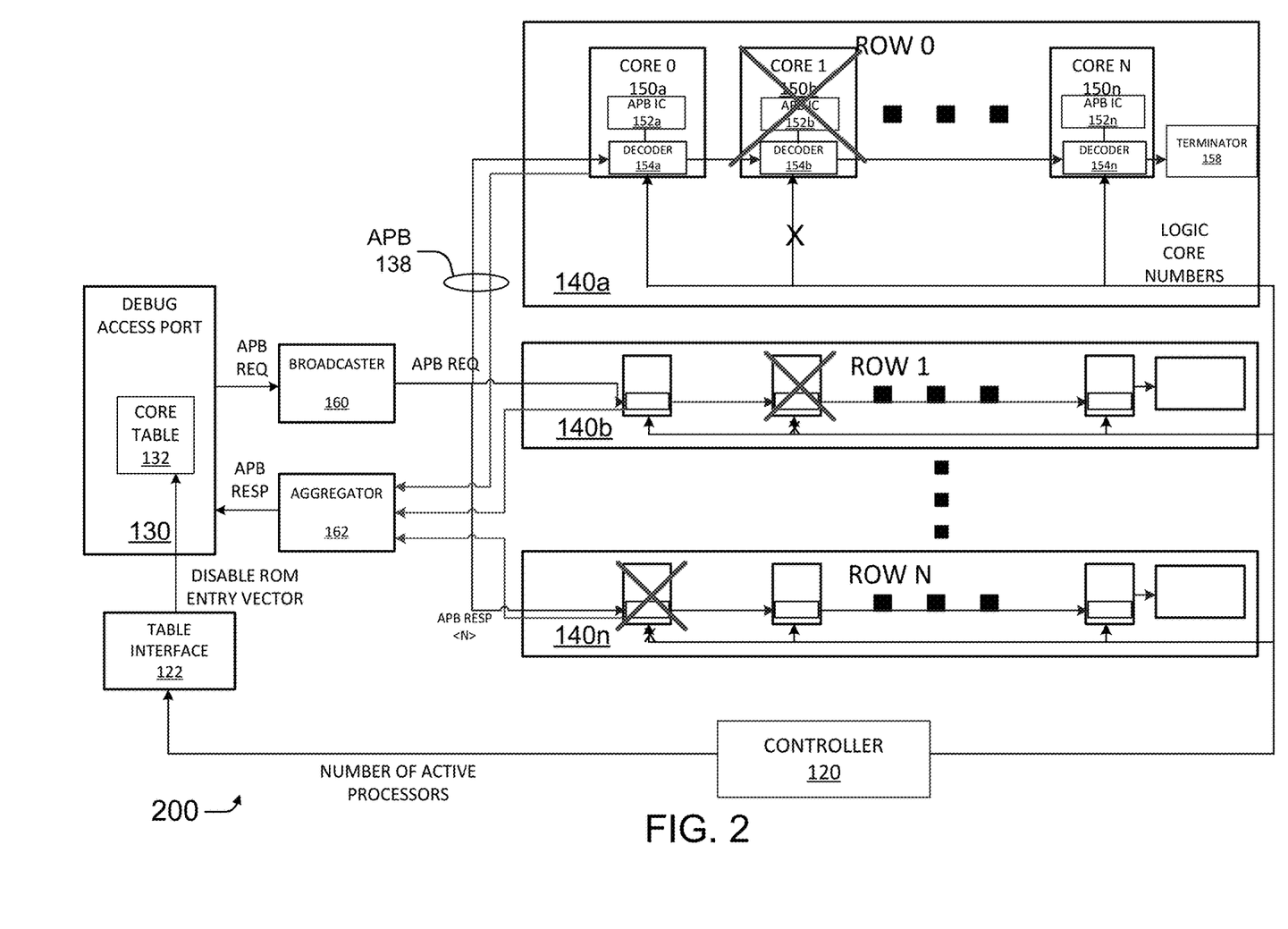
FIG. 2 is a block diagram of a multi-core processor system in one embodiment.

FIG. 2 is a block diagram of a multi-core processor system 200 in one embodiment. The system 200 includes a plurality of rows 140a-n, each row comprising multiple processor cores, such as processor cores 150a-n. For example, if the system 200 is a 64-core device, the 64 cores may be distributed among the rows 140a-n. As shown in row 140a, an advanced peripheral bus (ABP) 138 or comparable communications channel may connect each of the processor cores 150a-n. The APB 138 may extend from a broadcaster module 160 and an aggregator module 162 connecting to all rows 140a-n, and the APB 138 may terminate at each row 140a-n at a terminator module such as the module 158. A debug access port 130 may interface with the broadcaster module 160 and aggregator module 162, thereby enabling the debug access port 130 to transmit APB requests to the processor cores 150a-n and receive APB responses from the processor cores 150a-n via the APB 138. Alternatively, the APB 130 may be any bus or other communications channel, or combination of communications channels, suitable to carry communications between the components connected to the APB 138.

Each of the processor cores 150a-n may include a respective decoder unit 154a-n and a CPU debug environment that includes an APB interconnect (APB IC) 152a-n. A number of the processor cores are defective as represented by the "X" marks, including processor core 150b. However, some elements of the defective processor cores, such as the decoder unit 154b, may remain active to communicate via the APB 138. For example, the decoder unit 154b may receive upstream APB messages from the processor core 150a and forward those messages downstream towards a subsequent processor core, such as processor core 150n. The last processor core in the row 140a, processor core 150n, may selectively forward messages to the terminator module 158.

Some or all components of the system 200, including the processor cores rows 140a-n, debug access port 130, broadcaster module 160, aggregator module 162, and other components as shown may be implemented in a common system-on-chip (SoC). In view of unified nature of an SoC and the defective processor cores of the system 200, it may be advantageous to configure the system 200 as a system possessing a number of processor cores equal to (or less than) the number of active processor cores, thereby disregarding the defective processor cores. Such a configuration may be advantageous because it can simplify configurations for addressing the processor cores, during both normal and debugging operations. It also enables a partially-defective circuit to be configured and sold as a less complex circuit, thereby improving manufacturing yields.

In order to configure the system 200 to restrict addressability to the active processor cores, the integrity of each processor core may be tested and verified (e.g., via an external debugger connected to the debug access port 130), and based on the results, the defective and active processor cores may be identified. A controller 120 may receive data identifying the defective and active processor cores, and then assign a logical core identifier (ID) for each of the active cores. The logical core IDs may be an ordered sequence of numbers corresponding to the total number of active processor cores, or may follow an alternative symbol assignment to provide each of the active cores with a unique, addressable identifier. The logical core numbers may be distinguished from the physical ID of each processor core, and the controller may maintain a record of each processor core by its physical ID and assigned logical core ID. Once determined, the controller 120 may communicate with each of the active processor cores, such as processor cores 150a and 150n, to convey the logical core ID to the processor core. In response, the decoder 154*a-n* or other element of each active processor core may store the assigned logical core ID, referencing the logical core ID in subsequent operations as described below.

The controller 120 may also convey the number of active processors, and optionally the logical core IDs, to a table interface 122. The table interface 122, in turn, may communicate with a core table 132 stored at (or otherwise accessed by) the debug access port 130. The core table 132 may be a read-only memory (ROM) or other memory device, and may store a range of information, such as an indication of the number of active processor cores, as well as information about the processor cores. For example, the core table 132 may store entries indicating the logical core ID assigned to each of the active processor cores. The core table 132 may also store entries indicating the physical ID of each of the processor cores, although the debug access port 130 may be configured to address each of the processor cores by its logical core ID rather than its physical ID. The core table 132 may further include, initially or continually, entries corresponding to defective processor cores. The controller 120, via the core interface 122, may configure or update the core table 132 with data about the processor cores, such as the number of active cores and the physical and logical IDs of the processor cores. Further, the controller 120 may cause entries of the core table 132 corresponding to the defective processor cores to be disabled. As a result, when the debug access port 130 references the core table 132 to address one or more processor cores, it may retrieve the logical ID for those processor cores and include the logical ID in outgoing messages to those processor cores via the APB 138. Further, upon referencing the number of active processor cores indicated by the core table 132, the debug access port may indicate to any external device (e.g., an external debugger) the number of active processor cores without regard for the defective cores, thereby presenting the system 200 as a device with fewer total processor cores. Thus, the identity of each active core may be virtualized, and the defective processor cores may be effectively concealed from external devices communicating with the system 200.

To test each of the active processor cores, the debug access port 130 may interface with each of the rows 140*a-b* via the broadcaster module 160 and aggregator module 162. The debug access port 130 may be an on-chip module that interfaces with an external debugger device (not shown). Under direction from the external debugger device, the debug access port 130 may forward a debug request (e.g., an APB request), such as a read or write request, to the broadcaster 160. The debug request may include an address specifying a logical identifier associated with a target processor core. The broadcaster 160, in turn, may broadcast the debug request to each of the processor cores at each of the rows 140*a-n*. At a given row, such as row 140*a*, the decoder unit 154*a* of the first processor core 150*a* in the row 140*a* may receive the debug request via the APB 138. The decoder unit 154*a* may compare the address of the debug request against the logical ID associated with the processor core 150*a*, which it had previously stored upon receipt from the controller 120. If the decoder unit 154*a* detects a match between the address of the debug request against the logical ID of the processor core 150*a*, then the decoder unit 154*a* may forward the debug request to the debug environment of the processor core 150*a* via the APB IC 152*a*. The debug environment of the processor core 150*a*, in turn, may process the debug request, for example by performing a read or write operation according to the request, and generate a response message that is responsive to the debug request. If the processor core 150*a* encounters an error during processing the debug request, then the response message may include an indication of this error. Alternatively, if the error prevents the processor core 150*a* from even sending a response message, then the processor core 150*a* may fail to generate or send the response message.

Conversely, if the decoder unit 154*a* detects a mismatch between the address of the debug request and the logical ID of the processor core 150*a*, then the decoder may instead forward the debug request along the APB 138 to a subsequent processor core. In this example, the subsequent processor core, core 150*b*, is defective. Yet the decoder unit 154*b* of the processor core 150*b* may remain active, and may operate as a pass-through device by forwarding the debug request to the next processor core of the row 140*a*. If the debug request is passed through every decoder unit of the row 140*a*, including the last decoder unit 154*n*, without encountering a match with a logical ID of a processor core, then the decoder unit 154*n* may forward the debug request to the terminator module 158. The terminator module 158, upon receiving the debug request, may transmit an error signal back toward the aggregator module 162 via the APB 138.

The aggregator module 162 may be configured to collect the responses to the debug request from each of the rows 140*a-n* via the APB 138. In the example configuration shown, the processor cores are organized into multiple rows 140*a-n* each having multiple processor cores 150*a-n*. For each row, the aggregator module 162 may receive either a response message from the targeted processor core (if located within the row), or an error message from the terminator module of the row. Thus, in total, the aggregator module 162 may receive multiple error messages from respective terminator modules, as well as a single response message from the targeted processor core. By comparing the received responses to the responses expected from the rows 140*a-n*, the aggregator module 162 can verify whether the debug request was properly propagated to all of the rows 140*a-n* and to the targeted processor core. The aggregator 162 may then forward an indication of the received responses to the debug access port 130. For example, if the aggregator 162 receives the response message from the targeted processor and the multiple error messages from the remaining rows, as may be expected, then the aggregator 162 my forward the response message to the debug access port 130. The debug access port 130 may then forward the response message to the external debugger for analysis and evaluation of the target processor core. Alternatively, if the targeted processor core fails to transmit a response message, as described above, then the aggregator module 162 may receive no response from the row of the targeted core and error messages from the remaining rows. In response, the aggregator 162 may forward an error message or alert to the debug access port 130. The debug access port 130 may forward the error message or alert to the external debugger, which may then acknowledge an error at the targeted processor core.

The system 200 provides several advantages over previous approaches to debugging multi-core devices. For example, by virtualizing the identifier of each processor core via a flexible and reconfigurable logical ID, the processor cores do not need to be addressed by a static physical ID, such as a processor number. As a result, the external debugger connecting to the debug access port 10 can simply identify and address the processor cores by their logical IDs. Thus, if the system 200 were to be configured and sold as a device with fewer cores corresponding to the active processor cores, then the system 200 can be presented as possessing only the fewer cores as represented by the logical IDs, and as absent the defective cores. Therefore, an external debugger, and any other device interfacing with the system 200, may simply account for the active processor cores without regard to the defective cores, and, optionally, may not even have any visibility to the defective processor cores. Further, the features of the system 200 described above may be implemented in an Advanced RISC Machine (ARM) system, and may be compliant with the ARM Coresight V3 standard.

Figure 3:
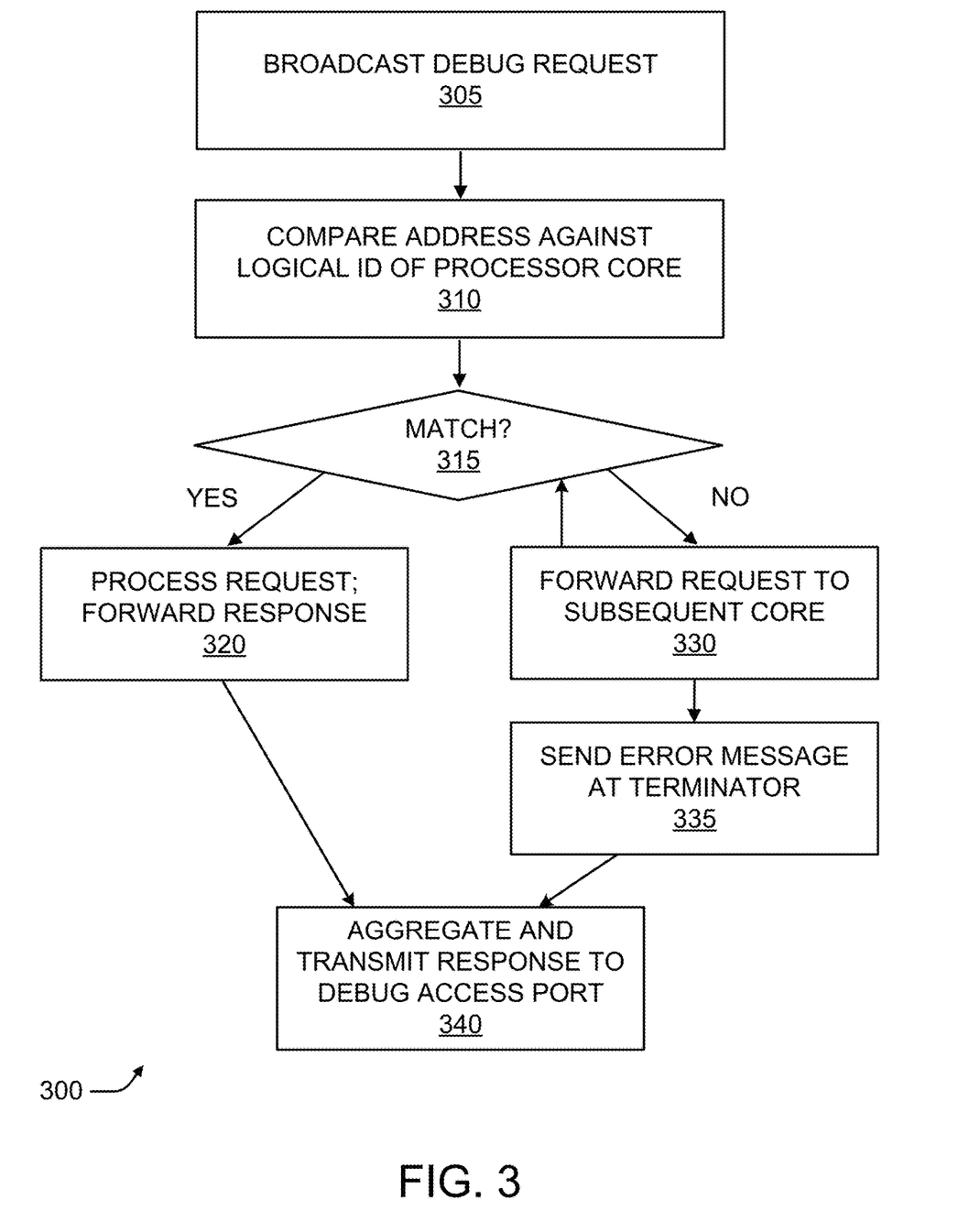
FIG. 3 is a flow diagram of a process of debugging a multi-core system in one embodiment.

FIG. 3 is a flow diagram of a process 300 of debugging a multi-core system in one embodiment. With reference to the system 200 described above, the debug access port 130 may forward a debug request, such as a read or write request, to the broadcaster 160, which may broadcast the debug request to each of the processor cores at each of the rows 140a-n (305). At each of the rows, for example row 140a, the decoder unit 154a of the first processor core 150a in the row 140a may compare the address of the debug request against the logical ID associated with the processor core 150a (310). If the decoder unit 154a detects a match between the address of the debug request against the logical ID of the processor core 150a (315), then the respective processor core 150a may process the debug request and generate a response message that is forwarded to the aggregator module 162 (320).

Conversely, if the decoder unit 154a detects a mismatch between the address of the debug request and the logical ID of the processor core 150a, then the decoder may instead forward the debug request to a subsequent processor core (330). Defective processor cores, such as the processor core 150b, may simply forward the request without further action. This process (315, 330) may continue at each row until either a match is found (320) or the debug request arrives at the terminator module 158. The terminator module 158, upon receiving the debug request, may transmit an error signal back toward the aggregator module 162 (335).

The aggregator module 162 may then aggregate the responses to the debug request from each of the rows 140a-n and transmit a corresponding response to the debug access port 340 (340). For example, if the aggregator 162 receives the response message from the targeted processor and the multiple error messages from the remaining rows, then the aggregator 162 my forward the response message to the debug access port 130. The debug access port 130 may then forward the response message to the external debugger for analysis and evaluation of the target processor core.

Figure 4:
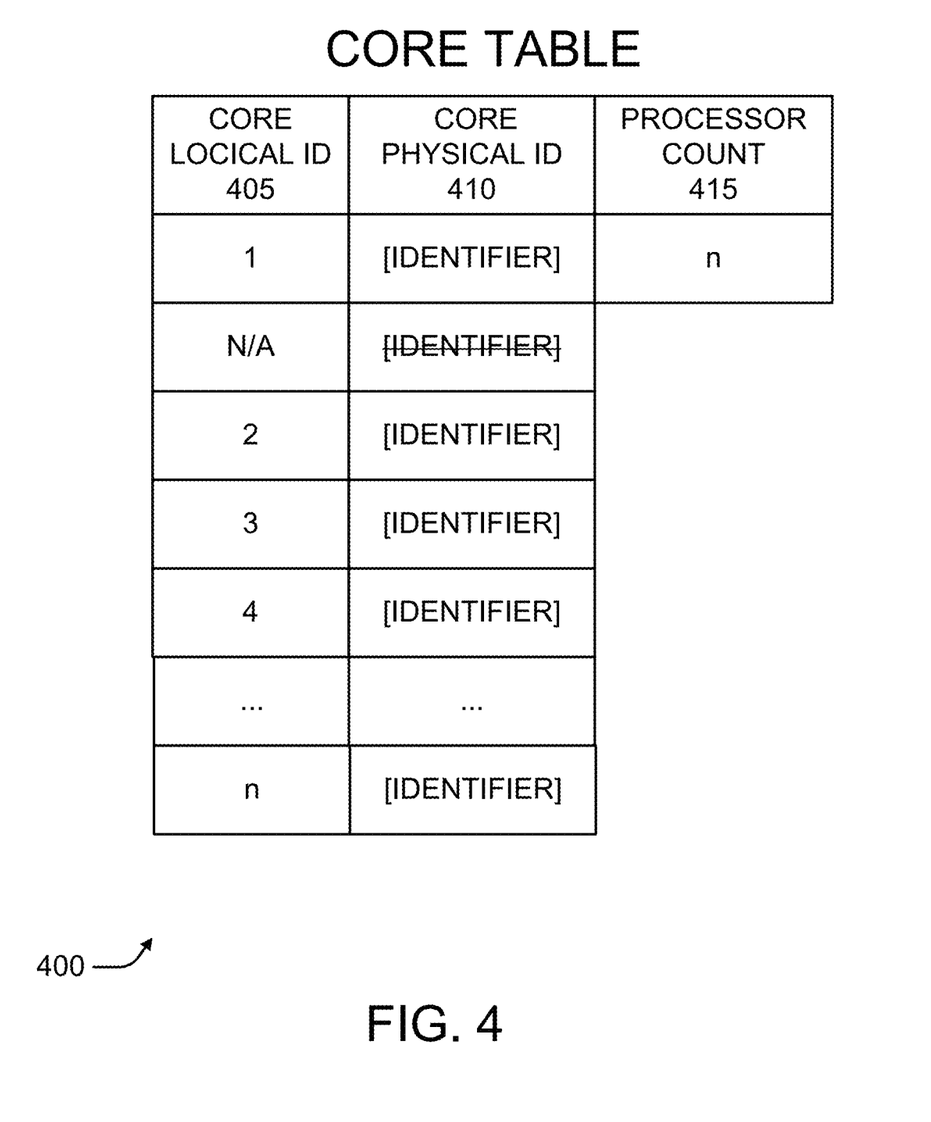
FIG. 4 is a diagram of a core table in one embodiment.

FIG. 4 illustrates a core table 400 in an example embodiment. The core table 400 may be implemented as the core table 132 in the system 200 described above. As shown, the core table 400 has a first column 405 storing entries indicating the logical ID of each active processor core of the system. For example, the logical IDs, as shown, may be numerical integers reflecting a count of the active processor cores (i.e., 1, 2, 3 . . . n). A second column 410 may store a physical ID of each of the processor cores, which may be a hardware identifier (e.g., serial number), another unique identifier specific to each processor core, or a number/identifier that is initially assigned to each processor core upon configuration in the system. The column 410 may include entries for both active and inactive processors. As such, in the system 200, the controller 120, upon identifying defective processor cores, may update the core table 400 to disable or delete entries corresponding to the defective processor cores. An example disabled entry is shown in the second row, wherein the physical ID is marked accordingly and a logical ID is not assigned ("N/A"). A third column 415 includes a single entry that indicates the number of active processors, which may be viewed by external devices as the total processor core count of the system.

In further embodiments, the core table 400 may omit some of the data described above. For example, a debug access port or external device may determine the number of processors of the system based on the core logical ID column 405, meaning that the processor count 415 may be omitted. Conversely, if the logical IDs are arranged in a known or predictable sequence, then the debug access port or external device may determine the logical IDs solely from the processor count 415, meaning that the logical ID column 405 may be omitted. Further, although the physical ID column 410 may be used in certain debugging or verification functions, the column 410 may be omitted if neither the debug access port nor any connected external devices is configured to use logical IDs.

Figure 5:
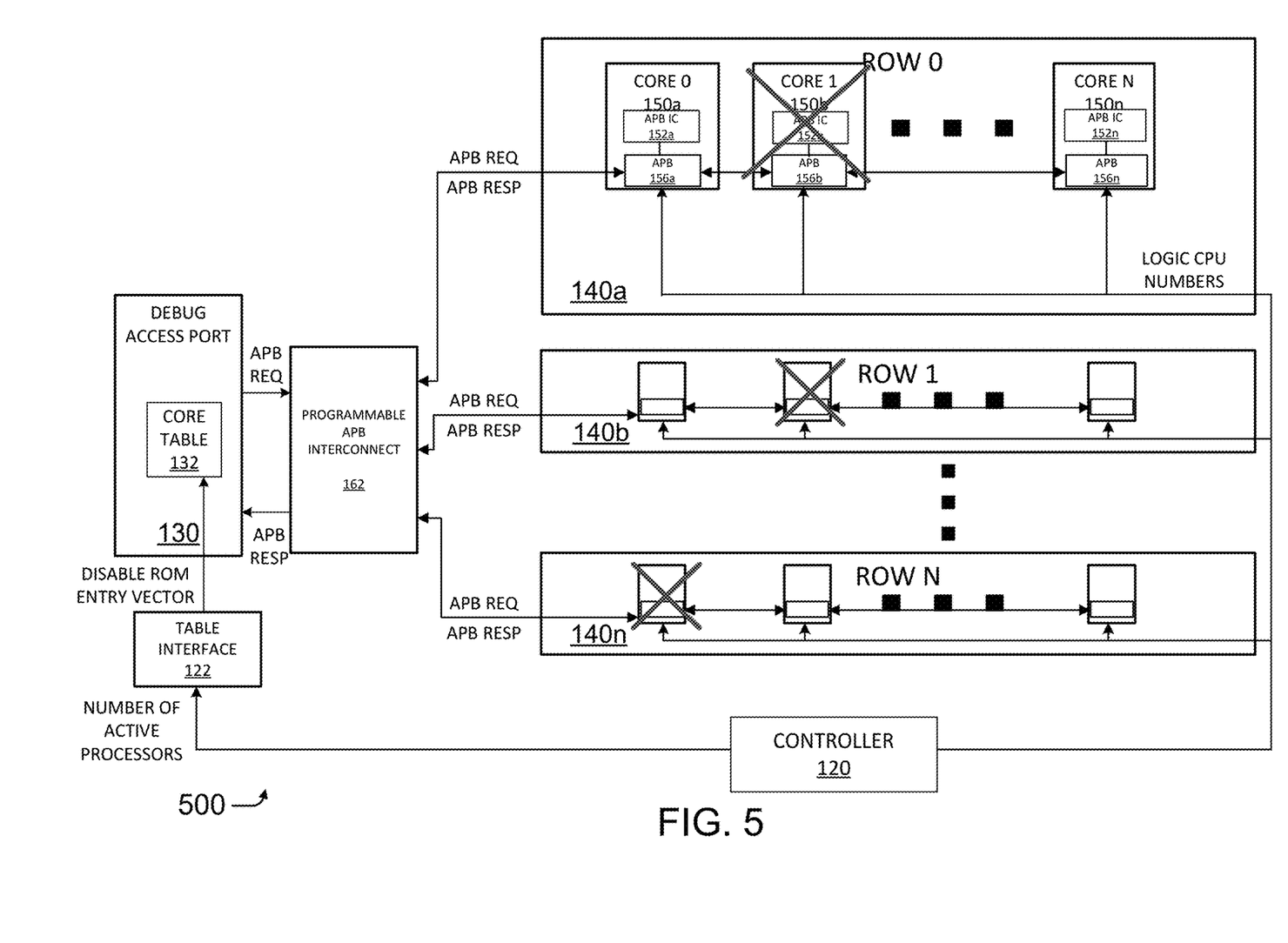
FIG. 5 is a block diagram of a multi-core processor system in a further embodiment.

FIG. 5 is a block diagram of a multi-core processor system 500 in a further embodiment. The system 500 may incorporate some or all features of the system 200 described above, including the debug access port 130, core table 132, table interface 122, controller 120, and rows 140a-n of processor cores 150a-n. However, the system may implement a programmable APB interconnect module 162, which may be configured to communicate with a first processor core of each of the rows 140a-n to transmit a debug request and receive a corresponding response. Further, each of the processor cores 150a-n may include a respective programmable APB interconnect 156a-n. Each of the programmable APB interconnects 156a-n may be configured to propagate a debug request among the interconnects 156a-n, selectively forward matching requests to the associated APB IC 152a-n, and forward a response message and/or an error message back to the programmable APB interconnect 162. In particular, the last programmable APB interconnect 156n of the row 140a may be configured to incorporate operation of the terminator module described above, generating and transmitting an error message toward the programmable APB interconnect module 162 if the address of the debug message does not match the logical ID of the processor core 150n.

While example embodiments have been particularly shown and described, it will be understood by those skilled in the art that various changes in form and details may be made therein without departing from the scope of the embodiments encompassed by the appended claims.

What is claimed is:

1. A circuit comprising:
   a plurality of processor cores;
   a broadcaster module configured to broadcast a debug request from a debugger device to at least one of the plurality of processor cores via a bus, the debug request including an address specifying a logical identifier associated with a target processor core of the plurality of processor cores;
   a plurality of decoder units, each of the plurality of decoder units being associated with a respective one of the plurality of processor cores and configured to 1) forward the debug request to a debug module of the respective processor core in response to detecting a match between the address of the debug request and a logical identifier associated with the respective processor core, and 2) forward the debug request towards a subsequent one of the plurality of processor cores via the bus in response to detecting a mismatch between the address and the logical identifier; and an aggregator module configured to forward a response message to the debugger device, the response message originating from the target processor core.

2. The circuit of claim 1, further comprising at least one terminator module connected to a respective terminal end of the bus, the at least one terminator module configured to forward an error signal to the aggregator module in response to receiving the debug request.

3. The circuit of claim 2, wherein the bus includes a plurality of parallel branches, each of the plurality of parallel branches connecting to a subset of the plurality of processor cores and terminating at one of the at least one terminator module.

4. The circuit of claim 3, wherein the broadcaster unit is further configured to broadcast the debug request to a first one of the plurality of processor cores at each of the plurality of parallel branches.

5. The circuit of claim 4, wherein the aggregator module is further configured to identify a debug success in response to receipt of the response message and at least one error message from the at least one terminator module.

6. The circuit of claim 1, wherein the address of the debug request is independent of a physical identifier (ID) of the target processor core.

7. The circuit of claim 1, wherein the plurality of processor cores includes at least one defective processor core.

8. The circuit of claim 7, further comprising a management unit configured to 1) assign a respective logical identifier to each functional processor core of the plurality of processor cores and 2) refrain from assigning a respective logical identifier to the at least one defective processor core.

9. The circuit of claim 8, wherein the management unit is further configured to communicate to the debugger device an indication of a number of functional processor cores of the plurality of processor cores.

10. The circuit of claim 7, wherein the bus is configured to transfer the debug request in a manner bypassing the at least one defective processor core.

11. The circuit of claim 7, wherein a decoder unit associated with the at least one defective processor core is configured to forward the debug request towards a subsequent one of the plurality of processor cores via the bus.

12. The circuit of claim 1, wherein the debug request includes one of a read request and a write request.

13. The circuit of claim 1, wherein the plurality of processor cores, broadcaster module, plurality of decoder units, and aggregator module are implemented in a common system-on-chip (SoC).

14. The circuit of claim 1, wherein the bus is an Advanced Peripheral Bus (APB).

15. A method comprising:
broadcasting a debug request from a debugger device to at least one of a plurality of processor cores via a bus, the debug request including an address specifying a logical identifier associated with a target processor core of the plurality of processor cores;
at a decoder module, forwarding the debug request to a debug module of a respective processor core of the plurality of processor cores in response to detecting a match between the address of the debug request and a logical identifier associated with the respective processor core;
at the decoder module, forwarding the debug request towards a subsequent one of the plurality of processor cores via the bus in response to detecting a mismatch between the address and the logical identifier; and
at an aggregator module, transmitting a response message to the debugger device, the response message originating from the target processor core.

16. The method of claim 15, further comprising, at a terminator module connected to a respective terminal end of the bus, forwarding an error signal to the aggregator module in response to receiving the debug request.

17. The method of claim 16, wherein the bus includes a plurality of parallel branches, each of the plurality of parallel branches connecting to a subset of the plurality of processor cores and terminating at one of the at least one terminator module.

18. The method of claim 17, further comprising broadcasting the debug request to a first one of the plurality of processor cores at each of the plurality of parallel branches.

19. The method of claim 18, further comprising identifying a debug success in response to receipt of the response message and at least one error message from the at least one terminator module.

20. The method of claim 15, wherein the address of the debug request is independent of a physical identifier (ID) of the target processor core.

21. The method of claim 15, wherein the plurality of processor cores includes at least one defective processor core.

22. The method of claim 21, further comprising:
assign a respective logical identifier to each functional processor core of the plurality of processor cores; and
refraining from assigning a respective logical identifier to the at least one defective processor core.

23. The method of claim 22, further comprising communicating to the debugger device an indication of a number of functional processor cores of the plurality of processor cores.

24. The method of claim 21, further comprising transferring the debug request in a manner bypassing the at least one defective processor core.

25. The method of claim 21, further comprising, at the at least one defective processor core, forwarding the debug request towards a subsequent one of the plurality of processor cores via the bus.

26. A circuit, comprising:
means for broadcasting a debug request from a debugger device to at least one of a plurality of processor cores via a bus, the debug request including an address specifying a logical identifier associated with a target processor core of the plurality of processor cores;
means for forwarding the debug request to a debug module of a respective processor core of the plurality of processor cores in response to detecting a match between the address of the debug request and a logical identifier associated with the respective processor core;
means for forwarding the debug request towards a subsequent one of the plurality of processor cores via the bus in response to detecting a mismatch between the address and the logical identifier; and
means for transmitting a response message to the debugger device, the response message originating from the target processor core.

* * * * *